(12) United States Patent
Yussouff et al.

(10) Patent No.: US 9,888,050 B2
(45) Date of Patent: Feb. 6, 2018

(54) METHOD AND APPARATUS FOR INTEGRATING VARIOUS NETWORK ELEMENTS AND PROVIDING MEDIA PROCESSING SERVICES

(71) Applicant: Verizon Patent and Licensing Inc., Basking Ridge, NJ (US)

(72) Inventors: Ashraf Yussouff, Herndon, VA (US); Fang Liu, Vienna, VA (US); John F. Littlefield, Aurora, CO (US); Sean Kane, Jackson, MI (US); Jason Jen, North Potomac, MD (US); Sutap Chatterjee, Tampa, FL (US); Vijaykumar Pennirselvam, Tampa, FL (US); Anirudha Joshi, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 267 days.

(21) Appl. No.: 14/035,492

(22) Filed: Sep. 24, 2013

(65) Prior Publication Data
US 2015/0089035 A1    Mar. 26, 2015

(51) Int. Cl.
H04L 29/06    (2006.01)
H04L 29/08    (2006.01)
H04N 21/2343  (2011.01)
H04N 21/472   (2011.01)

(52) U.S. Cl.
CPC ............ H04L 65/60 (2013.01); H04L 67/288 (2013.01); *H04L 65/605* (2013.01); *H04N 21/2343* (2013.01); *H04N 21/472* (2013.01)

(58) Field of Classification Search
None
See application file for complete search history.

(56) References Cited

U.S. PATENT DOCUMENTS

| | | | | |
|---|---|---|---|---|
| 2006/0236221 A1* | 10/2006 | McCausland | .......... | G06Q 30/02 715/201 |
| 2006/0253542 A1* | 11/2006 | McCausland | .......... | H04L 51/04 709/207 |
| 2007/0106680 A1* | 5/2007 | Haot | .................. | G06F 17/30017 |
| 2007/0106681 A1* | 5/2007 | Haot | .................... | G11B 27/034 |
| 2008/0219638 A1* | 9/2008 | Haot | ............... | H04N 21/25866 386/250 |
| 2011/0107379 A1* | 5/2011 | Lajoie | ................. | H04L 65/1016 725/87 |
| 2011/0197236 A1* | 8/2011 | Rao | ........................ | G06Q 30/02 725/74 |
| 2011/0252118 A1* | 10/2011 | Pantos | .............. | G06F 17/30053 709/219 |
| 2011/0276396 A1* | 11/2011 | Rathod | ............. | G06F 17/30867 705/14.49 |

(Continued)

Primary Examiner — Philip Chea
Assistant Examiner — Hassan Khan

(57) ABSTRACT

An approach for integrating network elements and providing media processing services, which includes generating at least one integration interface for integrating at least one network element into a media processing platform. The approach also includes determining access information associated with the at least one network element, generating a master parameters list for the at least one network element for use in a processing of a media content item, and communicating the master parameters list via the at least one integration interface to the at least one network element.

20 Claims, 16 Drawing Sheets

(56) References Cited

U.S. PATENT DOCUMENTS

| | | | |
|---|---|---|---|
| 2012/0066304 A1* | 3/2012 | Marmon | H04W 4/001 709/204 |
| 2013/0031208 A1* | 1/2013 | Linton | H04L 67/125 709/217 |
| 2013/0086279 A1* | 4/2013 | Archer | H04L 69/14 709/233 |
| 2013/0128947 A1* | 5/2013 | Fryer | H04N 21/2343 375/240.01 |
| 2013/0179761 A1* | 7/2013 | Cho | G06F 17/21 715/202 |
| 2013/0227283 A1* | 8/2013 | Williamson | H04L 9/0825 713/168 |
| 2014/0226711 A1* | 8/2014 | Ramamoorthy | H04N 19/40 375/240.02 |

* cited by examiner

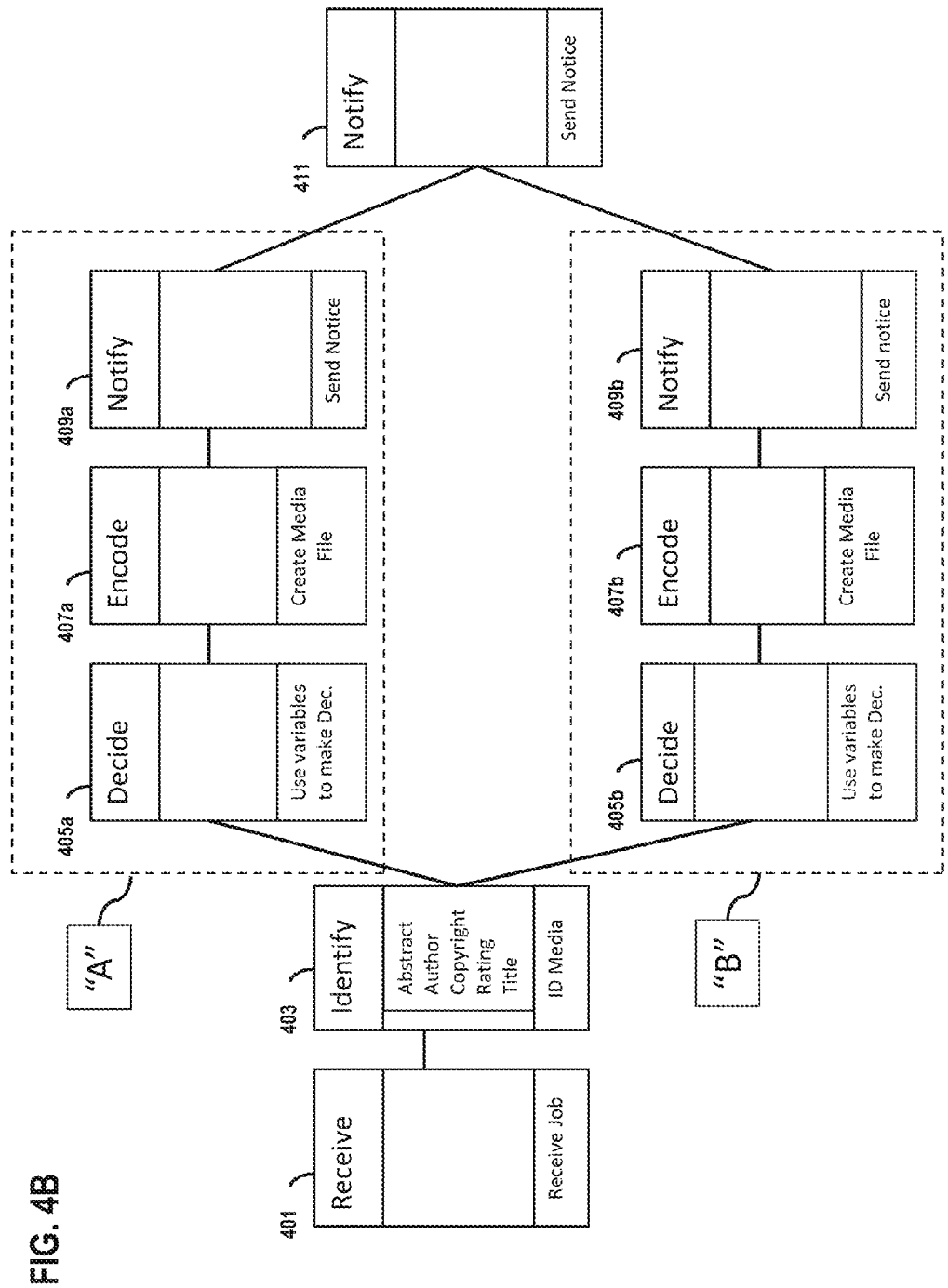

FIG. 4C

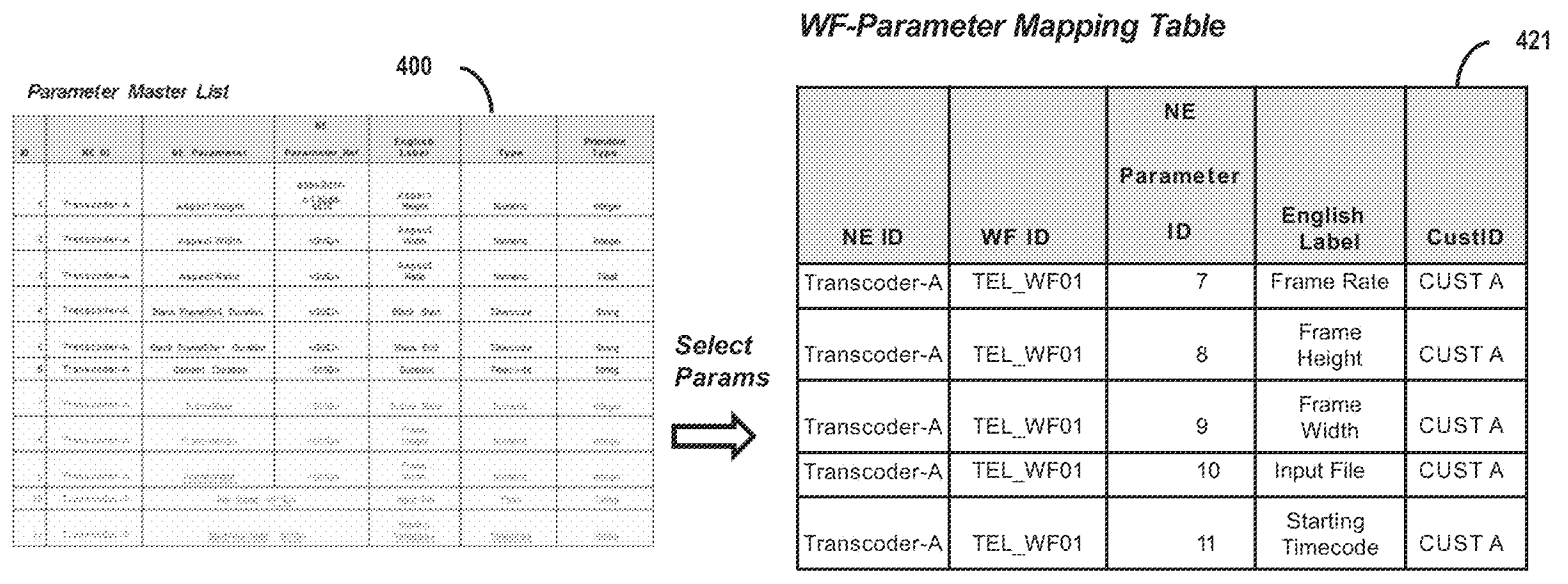

*WF-Parameter Mapping Table* — 421

| NE ID | WF ID | NE Parameter ID | English Label | CustID |
|---|---|---|---|---|
| Transcoder-A | TEL_WF01 | 7 | Frame Rate | CUST A |
| Transcoder-A | TEL_WF01 | 8 | Frame Height | CUST A |
| Transcoder-A | TEL_WF01 | 9 | Frame Width | CUST A |
| Transcoder-A | TEL_WF01 | 10 | Input File | CUST A |
| Transcoder-A | TEL_WF01 | 11 | Starting Timecode | CUST A |

⇧ *Select Params*

*Parameter Master List* — 400

FIG. 4E

SKU SPEC WMA 640x480

WF: TEL_WF02

| ID | NLS_Param eter | English Label | Type | Primitive Type | Default Value | Mandatory? | Locked? |
|---|---|---|---|---|---|---|---|
| 7 | FrameRate | Frame Rate | Numeric | Integer | 15 | Y | Y |
| 8 | FrameHeight | Frame Height | Numeric | Integer | 640 | Y | Y |
| 9 | FrameWidth | Frame Width | Numeric | Integer | 480 | Y | Y |
| 10 | FileName | Input File | Text | String | | Y | N |
| 11 | StartTimeCode | WMA Start Timecode | Timecode | String | 00:00:00@15 | N | N |

441

443

METHOD AND APPARATUS FOR
INTEGRATING VARIOUS NETWORK
ELEMENTS AND PROVIDING MEDIA
PROCESSING SERVICES

BACKGROUND INFORMATION

The growth in availability of media content (audio, video) and the various types of devices, which the media content may be consumed at, requires content providers to process the content for consumption by different users at different devices, storage and archive, and delivery over the network or on physical media (e.g., DVD or BluRay discs, etc.) For example, the content may be processed for converting a media file format to one or more other formats, edit content in and/or out, change quality or timing of the content, or the like. A processing system may be utilized for personal use or by a content producer or provider (e.g., an enterprise client), where the system may employ various processing elements and architecture to provide the desired service. However, with more complex architectures, networks, and user interface requirements, maintaining and updating the system may require substantial resources and overhead as additional network elements and components are integrated.

Based on the foregoing, there is a need for an approach to provide a media processing architecture and services platform that allows network elements and components to be easily integrated and their diverse unique services may be exposed to clients without an abstraction layer, yet within the confines of a framework so that the clients incur minimal or zero switching costs.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 4A through 4G illustrate parameter lists, workflows, mapping tables, and a client order form associated with a processing request, according to various embodiments;

DESCRIPTION OF THE PREFERRED
EMBODIMENT

An apparatus, method, and software for integrating network elements and providing media processing services. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
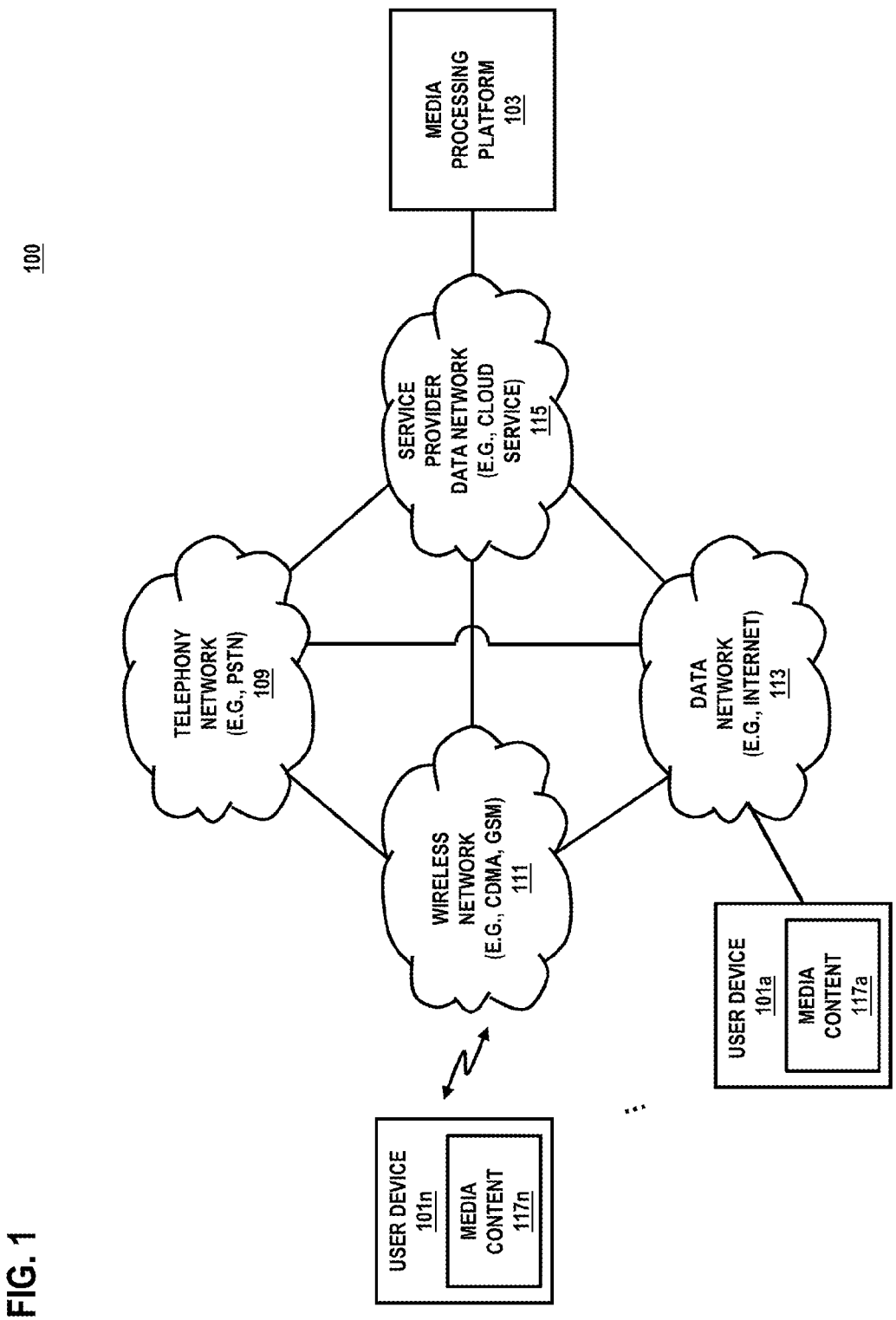
FIG. 1 is a diagram of a system capable of integrating various network elements into a media processing architecture and services platform, according to one embodiment.

FIG. 1 is a diagram of a system capable of integrating various network elements into a media processing architecture and services platform. As previously discussed, a media processing platform may be utilized to provide various services for processing a broad range of media content items of various types where a variety of users (e.g., for personal or professional applications) may access and interact with the media processing platform for submitting media content items and related processing parameters. In more complex processing architectures, various steps and techniques may be utilized to render more comprehensive and sophisticated levels of service, which may include a broader range of options made available to the users. In such a system, a variety of network elements (NEs), software, algorithms, programs, etc. may be utilized so that a wider range of media content items may efficiently and rapidly be processed, where each component of the system may provide different options and functionalities. However, in order to provide efficient and high quality services to the users, the media processing platform may need to be updated, for example, by adding new NEs and resources to the architecture, which may be available from different vendors. But in order to integrate the new elements and resources with the existing system/architecture, the service provider of the media processing platform may also need to update various adapters, applications, software, algorithms, templates, and the like so that various components of the system may be able to access and utilize the new NEs. However, the updating process may be challenging as the service provider may need to provide substantial time and resources, for example, to generate or update an abstract layer or an interface (e.g., including intelligence) for each new NE. For instance, an integration process of a new NE should allow for a parameters list, media content item, and user input to be properly communicated to the new NE. However, since various NEs may be from different vendors, the abstract layer or an adapter module may also need to be updated as new NEs are integrated into the system.

To address the above issue of integrating new NEs, the system 100 of FIG. 1 provides the capability for integrating network elements into an existing system architecture while providing a foundation for complying with various evolving industry standards. Further, a system provider may be able to quickly integrate into an existing system one or more new NEs with no or with minimal changes to other parts of the system and potentially without a need for an abstract layer or an adapter to translate the various processing parameters and operation requests for each NE. Once the new NEs are integrated into the system, the available processing platform options and NEs may be presented to the users so that the users may select one or more NEs and provide desired processing parameters for use in processing one or more media content items submitted by the users. In one example, the NEs may be operated using native workflows or job specification (e.g., processing specification) languages and/or operational commands, where corresponding workflow-references may be configured in a core platform for managing the overall workflow execution and job control. In one scenario, a customer/client may request a processing of a certain media content item, which processing may be accomplished via a plurality of sub-processing steps in a NE. In one embodiment, the core platform may determine and configure one or more workflows in a NE for completing the processing request.

In one embodiment, additional NEs may be integrated into the platform by loading NE topology details into one or more components of the media processing platform 103 for managing the workflows in the NEs, generating master parameters lists associated with the NEs, and load the master parameters lists into the one or more components of the media processing platform 103. Additionally, generic native workflows may be generated and communicated to the new NEs where corresponding workflow-references may be created and mapped in the one or more components (e.g., the core platform). In one embodiment, the core platform may generate one or more client-specific native workflows/profiles and communicate to each NE as well as generate their corresponding workflow-references in the core platform.

In one scenario, the user input may directly be communicated to one or more NEs without the core platform (e.g., an adapter) having to translate or interpret a processing parameter list before it is communicated to a particular NE. In doing so, the core platform may be able to efficiently generate a plurality of workflows for the processing of the media content items at various network elements. In one use case scenario, a user may interface with an ordering platform to create and submit a job order for processing a media content item, wherein the user may be presented with a template which may include various default and selectable processing parameters for use in processing the media content item. In various scenarios, a user may select a particular NE for processing a certain media content item, where a previous processing parameters list may be utilized in processing the media content item. In one scenario, one or more parameters lists may be associated with a certain user so that the user may reuse those parameters lists for subsequent processing requests (e.g., job orders).

For the purpose of illustration, the system 100 may include one or more user devices 101a-101n with media content applications 117a-117n that may be utilized to access media processing services provided by a media processing platform 103 over one or more networks, including a telephony network 109, a wireless network 111, a data network 113, a service provider data network 115, etc. The media processing platform may be a standalone third-party service provider or maybe implemented as a part of the service provider data network 115. By way of example, the networks 109, 111, 113, and 115 may be any suitable wireline and/or wireless network, and be managed by one or more service providers. For example, telephony network 109 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109, 111, 113, and 115 may be completely or partially contained within one another, or may embody one or more of the aforementioned infrastructures. For instance, the service provider network 119 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions.

Figure 2:
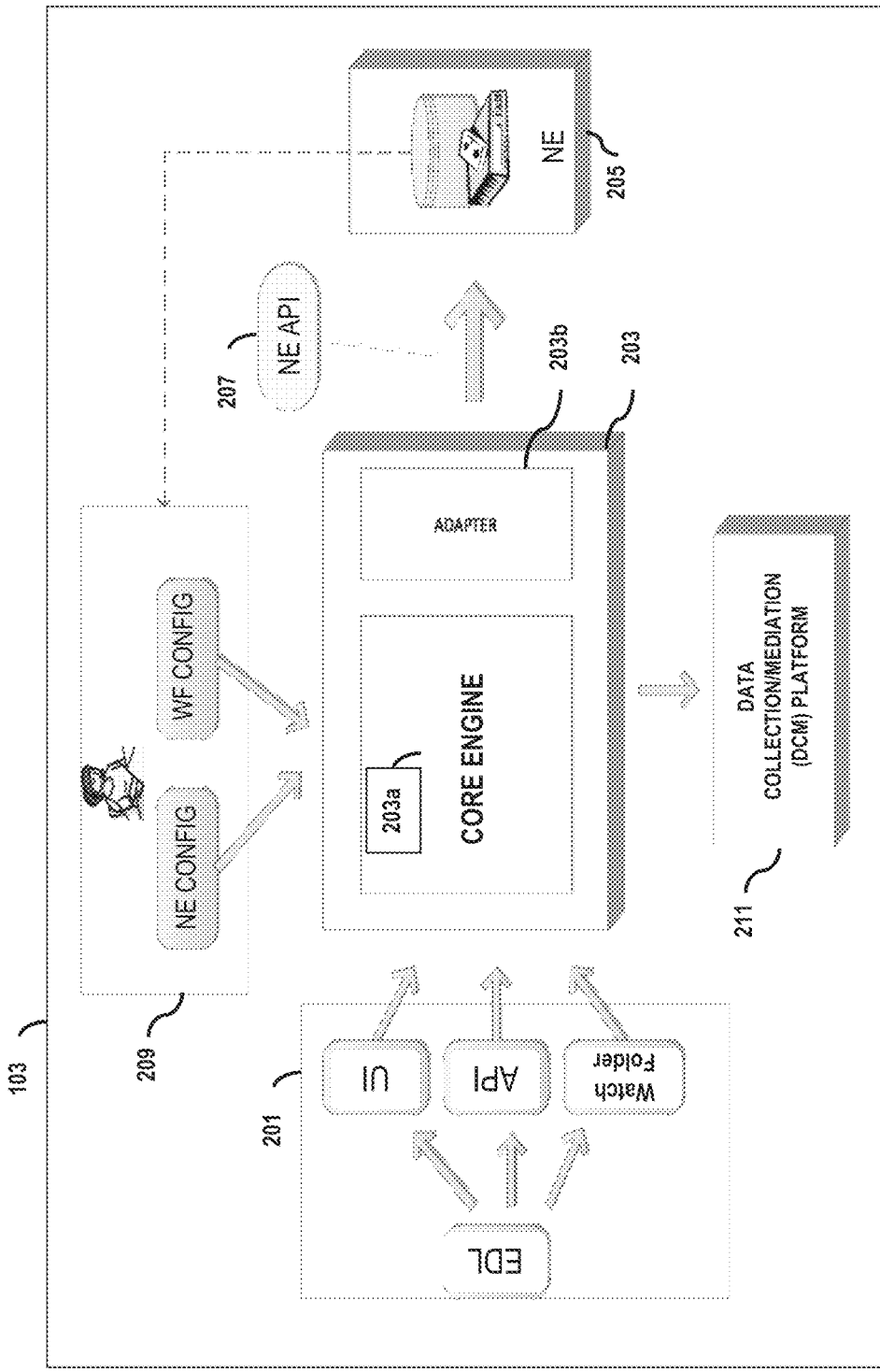
FIG. 2 is a diagram of a media processing platform architecture, according to one embodiment.

FIG. 2 is a diagram of a media processing platform architecture, according to one embodiment. In one example, the media processing platform 103 may include an ordering platform 201, a core platform 203, one or more NEs 205, a configuration manager module 209, and a data collection/mediation (DCM) platform 211.

In one embodiment, the ordering platform 201 may include a user interface, whereby a user may be presented with various options and templates for submitting media content items (e.g., digital files) and generating, updating, or amending one or more processing parameter lists, which may be used to process the media content items. In one example, a template may include various default processing parameters and additional optional and/or required parameters, wherein a user may select from a list of options for generating a complete parameter list associated with a certain job order. In one embodiment, a user device may directly interact with the ordering platform 201 via an application programming interface (API), where the user may not necessarily have to directly interface with the ordering platform. In another embodiment, a job order may be placed in a receiving module (e.g., watch folder) at the ordering platform, whereby the ordering platform may automatically detect and process the job order. In one embodiment, the job order may include one or more parameter lists and/or may indicate that one or more previously utilized parameter lists should be used to process the media content item included with the job order. In one embodiment, a user may provide an edit-decision-list (EDL), which may be utilized in processing the media content item. In one embodiment, the ordering platform 201 may interface with the core platform 203.

In one scenario the core platform 203 may include, at least, a core engine 203a and an adapter 203b. In one embodiment, the core engine 203a may process a job order received from the ordering platform and determine one or more workflows for processing a media content item associated with the job order. Further, the core engine 203a may determine one or more NEs 205 for processing the media content item associated with the job order as well as manage the one or more workflows. In one embodiment, the adapter 203b may determine one or more communication protocols or methods 207 (e.g., API) for transmitting information associated with the one or more workflows to the one or more NEs that were determined by the core engine 203a. In one embodiment, the adapter 203b may pass the information directly to the NEs. In various embodiments, the core engine 203a may utilize one or more algorithms, software, applications, for the like to perform various tasks associated with the workflows.

In various embodiments, the NEs 205 may include a plurality of different components for processing the media content items; for example, various servers, various software, various programs, various applications, various algorithms, and the like which may be based on different standards and from various sources and manufacturers.

In one embodiment, the configuration manager module 209 may be utilized to configure the core platform 203, the native workflows for the NEs 205, the workflow-references in the core platform 203, and the like. For example, an engineering team may perform the configuration based on various requirements by a user, by a service provider, and the like.

In one embodiment, the media processing platform 103 may include a DCM platform 211, where various data associated with clients, client accounts, and processing requests may be stored or analyzed. Additionally, the DCM platform 211 may receive information and updates from the core platform 203 for performing various billing and tracking functions.

Figure 3:
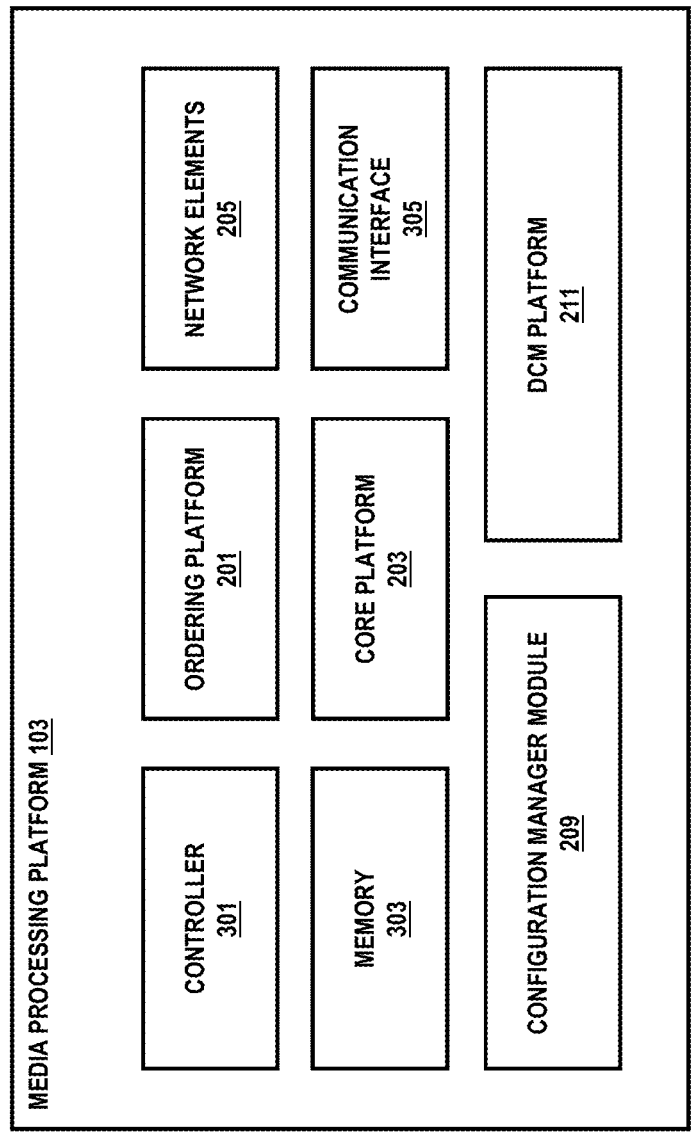
FIG. 3 is a diagram of components of the a media processing platform, according to one embodiment.

FIG. 3 is a diagram of components of the media processing platform 103, utilized over the system 100, according to one embodiment. By way of example, the media processing platform 103 includes one or more components for providing generic media processing architecture and services. It is contemplated that the functions of these components may be combined in one or more components or performed by other components of equivalent functionality. In this embodiment, the media processing platform 103 further includes a controller 301, memory 303, the communication interface 305, the ordering platform 201, the core platform 203, the one or more NE 205, the configuration manager module 209, and the DCM platform 211. The controller 301 may execute at least one algorithm (e.g., stored at the memory 303) for executing functions of the media processing platform 103. For example, the controller 301 may interact with the ordering platform 201 to facilitate receiving user input associated with a job order for processing a media content item. In various embodiments, the communication interface 305 may be utilized to provide one or more communication channels to the users and/or to various service providers and network elements. For example, the communication interface 305 may be utilized to transmit client processing requests, parameters lists, native workflow configuration information, and the like to the NEs 205.

FIGS. 4A through 4G illustrate parameter lists, workflows, mapping tables, and a client order form associated with a processing request, according to various embodiments.

Figure 4A:
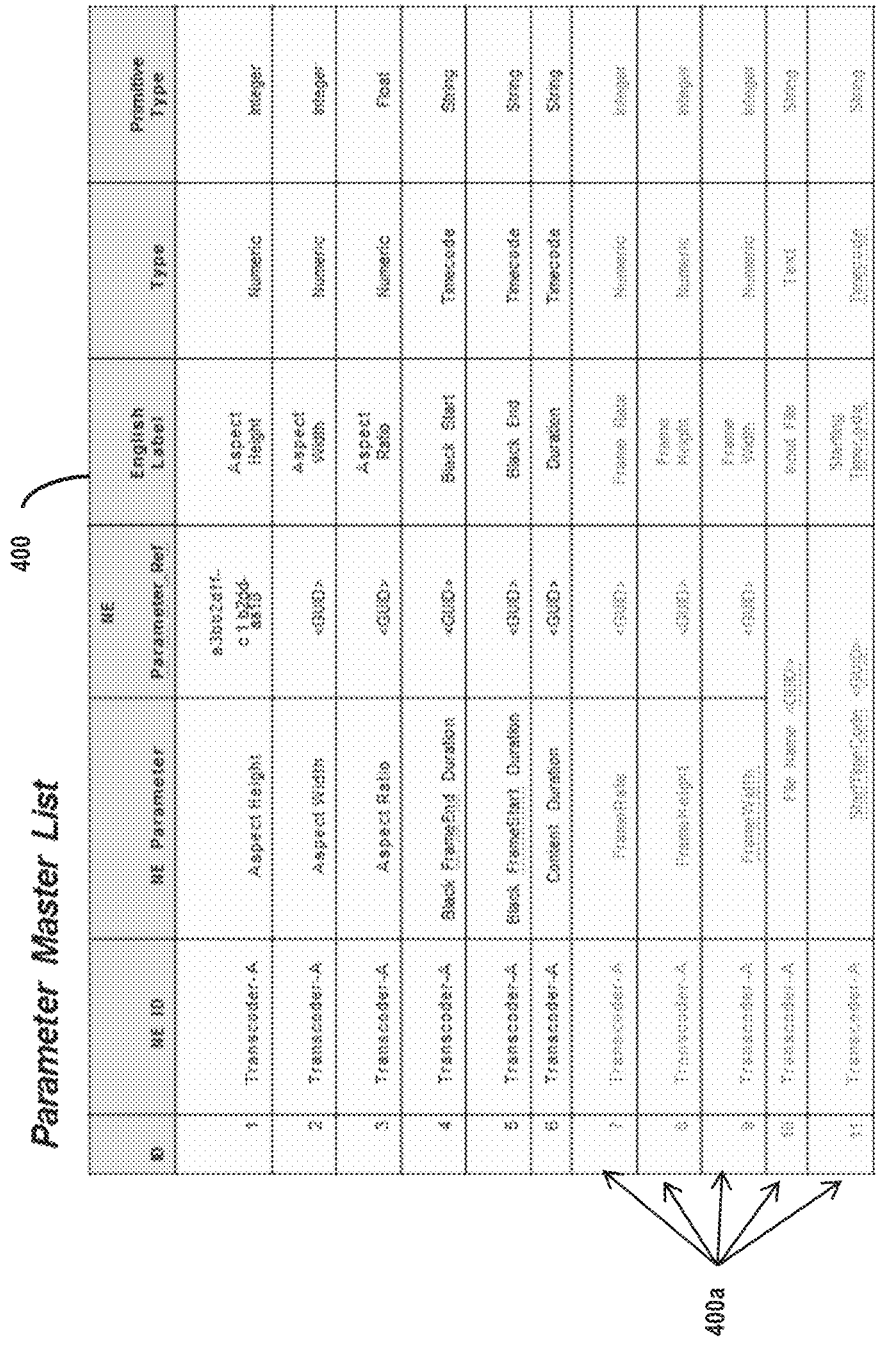

In FIG. 4A, a parameter list (e.g., master list) 400 for a certain NE (e.g., a Transcoder-A by a certain vendor) is created, which includes various values inputs, which may indicate parameters that are to be used in processing a media content item. In one example, one or more of the values and inputs may be set by default, for instance, based on a processing request, a processing type, a media content item type, a client output profile, a NE, or the like. For example, the list may indicate a NE that is to be used to process a media content item, various operational processing parameters (aspect height, aspect with, aspect ratio, etc.), parameter ID, NE_ID, NE_Parameter, etc. In one instance, one or more parameters 400a (e.g., Frame Rate, Frame Width, Frame Height, File Name, Starting Timecode, etc.) may be changed/overridden (e.g., by a client).

Referring to FIG. 4B, the parameter list of FIG. 4A may be used to create two concurrent native workflows "A" and "B" in a NE (e.g., Transcoder-A) by a certain vendor, and for a certain client (e.g., "CUST_A"). At different stages of the workflows, the system may analyze and process different inputs and execute various processes. For example, at 401, the media processing platform 103 may receive a job order (processing request) from a client, and at 403, various information associated with the job order and the media content item may be identified; for example, information about the abstracted, author, copyright, rating, title, and the like may be determined. Further, two native workflows "A" and "B" may be created and variables from the parameter list may be utilized to make decisions, 405a and 405b, for processing one or more media content items. Furthermore, at 407a and 407b, the processed media content items may be encoded and one or more output files created. Next, at 409a and 409b, one or more notifications are sent to a common processing element 411 to indicate the completion of the processing in the workflows "A" and "B". Referring to FIG. 4C, in one embodiment, the parameter list 400 may be utilized to determine a workflow parameter mapping table 421; for example, the parameter elements 400a from the list 400 may be utilized to create a workflow-parameter-mapping-table 421.

Figure 4D:
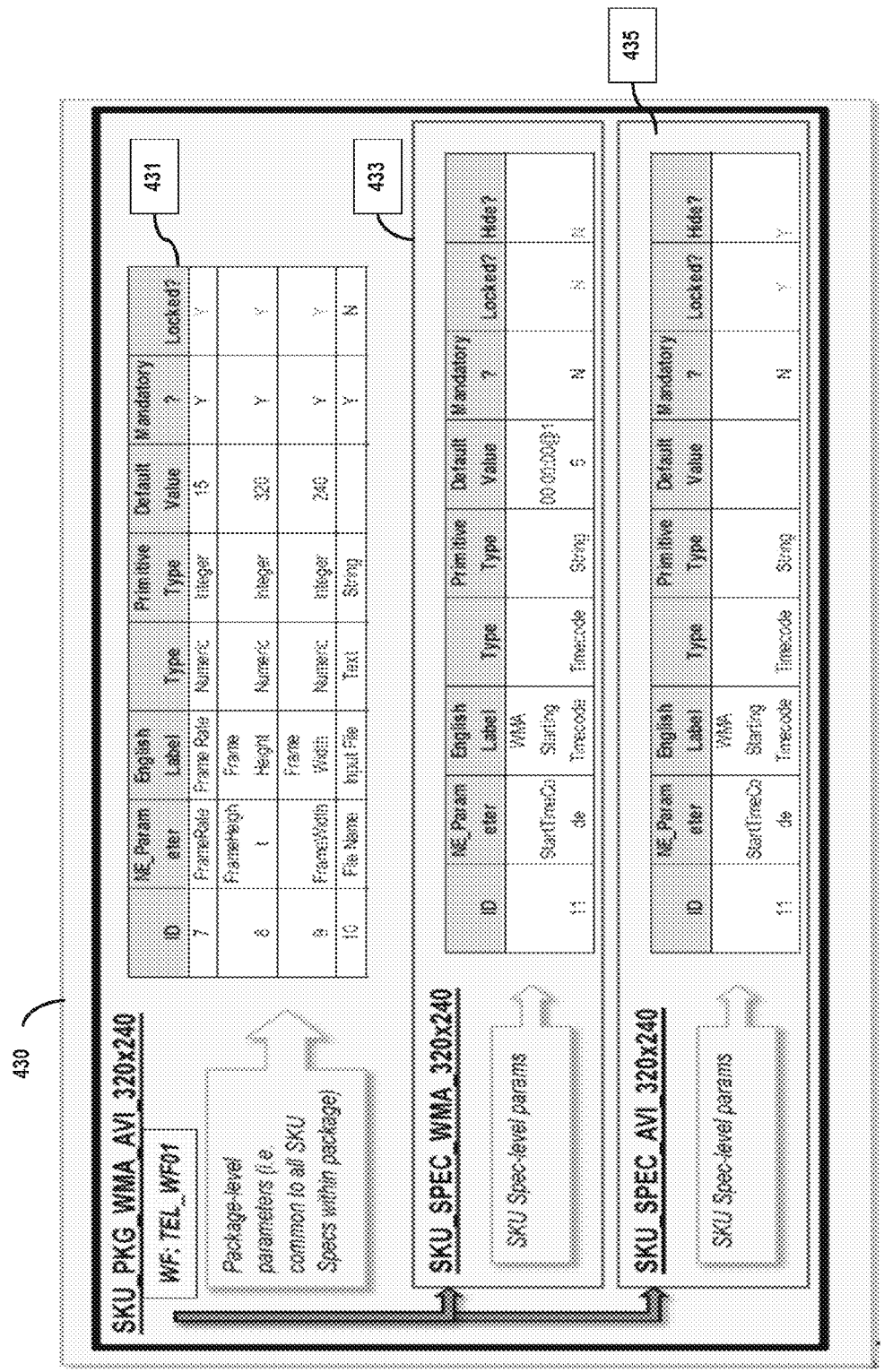
Figure 4F:
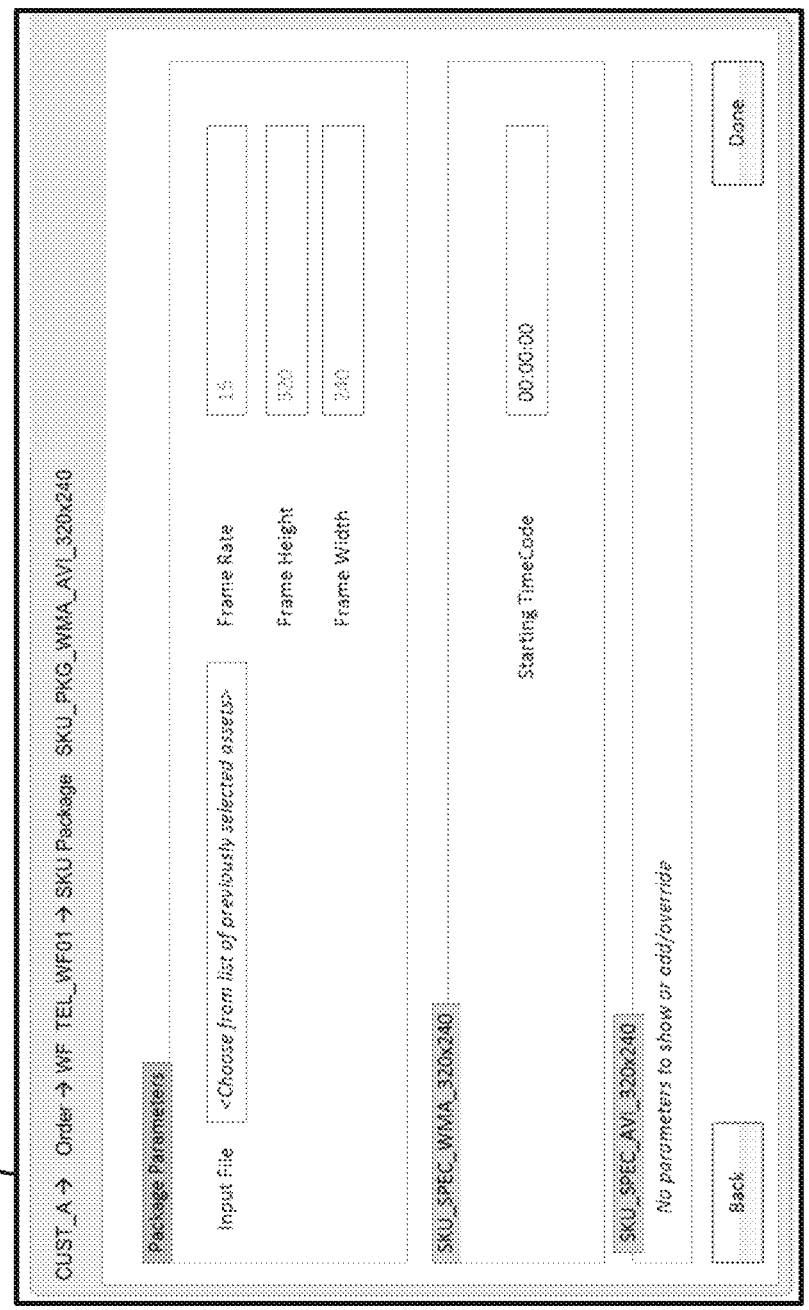

FIG. 4D shows creation of a unique specification package identifier (e.g., stock-keeping unit (SKU)) for the two concurrent workflows of FIG. 4B, which is associated with CUST_A. In the diagram 430, various parameters 431, from the parameter list 400a, are utilized to create a package-level parameters (e.g. common to all SKU specs within package) for the first workflow "A" of FIG. 4B. Further, another parameter (StartTimeCode), from the parameter list 400a, is utilized to create an SKU spec-level parameters 433 and 435, for generating two different outputs. FIG. 4E illustrates SKU spec package 441, which is created for the second workflow "B" of FIG. 4B where the FrameHeight and FrameWidth are at 640×480 and are indicated in the parameter list 443. FIG. 4F depicts a job order form 445, which may be used by a client (e.g., CUST_A), to input various parameters (e.g., for SKU spec package), for instance via the ordering platform 201.

Figure 4G:
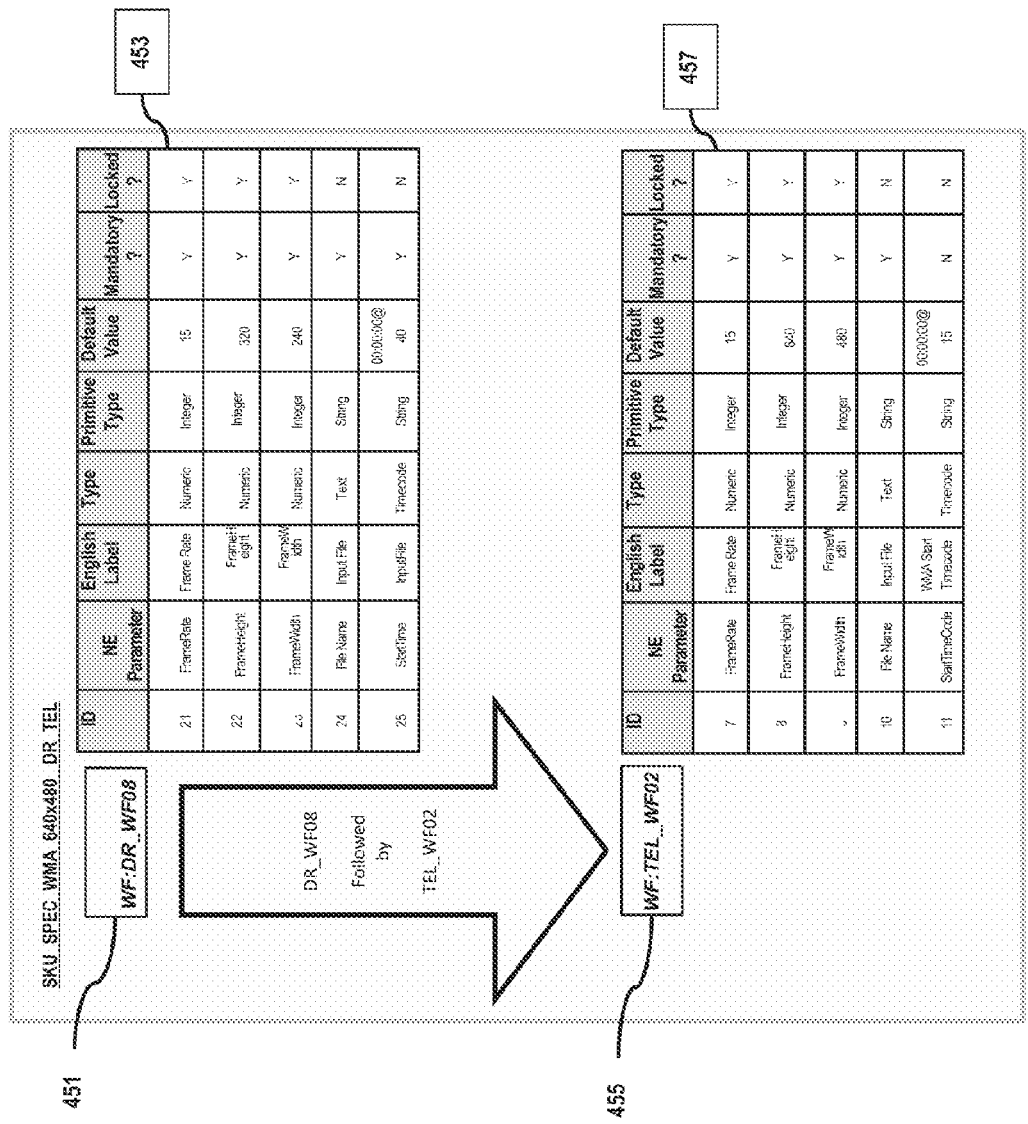

FIG. 4G illustrates a scenario where two workflows may sequentially process a media content item and produce a final output. In one embodiment, two or more sequential processes may be utilized to produce one or more final outputs. For example, a media content item may be processed via a first workflow at a first NE to produce a first output, which then may be used as an input into one or more workflows at one or more same/different types of NEs for producing one or more other (e.g., final) outputs. In one scenario, a workflow 451 at a NE "DR" may process a media content item based on parameters list 453 and produce a first output, which then may be used as an input into the workflow 455 at a NE "TEL" for a processing based on parameters list 457 and producing a second output. In various scenarios, an original media content item may be processed a plurality of instances via a plurality of workflow and network elements.

Figure 5:
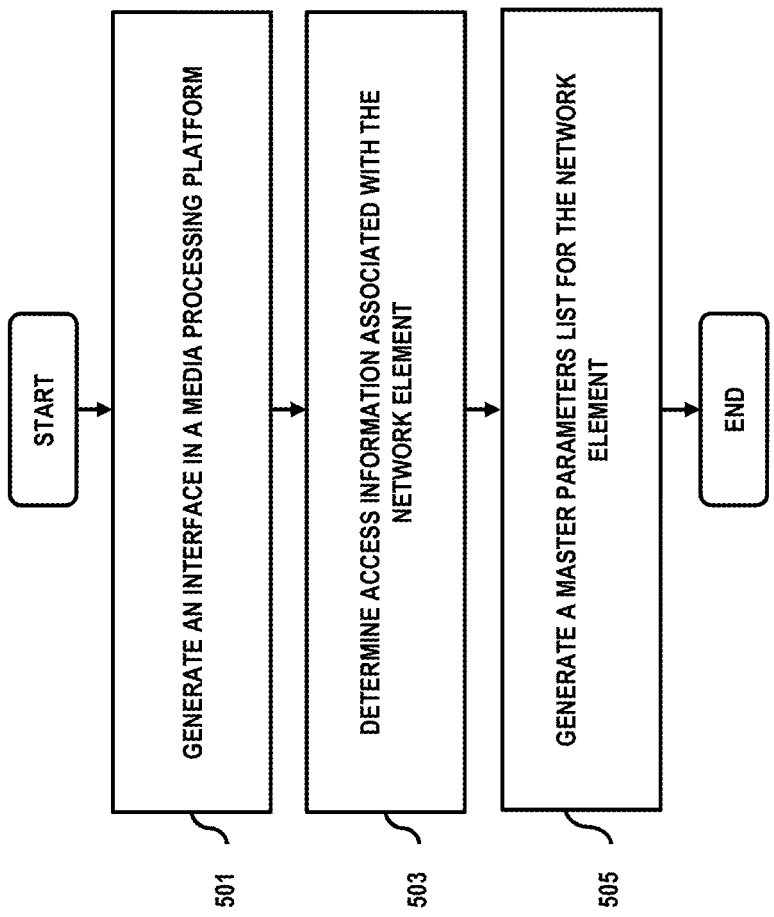
FIG. 5 is a flowchart of a process for integrating one or more network elements into a media processing platform, according to one embodiment.

FIG. 5 is a flowchart of a process for integrating one or more network elements into a media processing platform according to one embodiment. For the purpose of illustration, process 500 is described with respect to FIG. 1. It is noted that the steps of the process 500 may be performed in any suitable order, as well as combined or separated in any suitable manner.

As shown in FIG. 5, in step 501, the media processing platform 103 may generate at least one interface in a media processing platform for interfacing with at least one network element. In one instance, a service provider may wish to add one or more new NEs to its media processing platform 103 in order to have additional capacity and/or to provide updated and enhanced capabilities to its clients. However, a new NE would need to be bonded/coupled (e.g., e-bonding) with one or more components of the media processing platform 103 before the components can communicate with and utilize the new network element. Therefore, as part of the integration process, the service provider may develop and generate one or more integration interface applications for use in integration of new NEs into a media processing platform 103. In one example, the new NEs may be similar to or be the same as current NEs in the system, wherein the additional new NEs would provide greater capacity for efficiently processing various media content items. In one example, the new NEs may be different than the current NEs in the system, wherein the different new NEs may provide additional capabilities and functionalities for processing the media content items. In one embodiment, and integration interface may include elements from prior integration interface applications and/or it may include elements provided by one or more vendors of the new network elements.

In step 503, the media processing platform 103 may determine access information associated with the at least one network element. In various embodiments, a service provider may determine the access information from a vendor of a NE or from requirements associated with the network element. For example, the access information added to the platform may include identification information, version, communication protocol, topology information (e.g., how many), or the like. In one embodiment, a plurality of same/similar NEs may be integrated into the media processing platform 103 where each NE may directly interface with one or more components of the media processing platform 103. For instance, a core processing platform within the media processing platform 103 may communicate and interface with each of the network elements, for example, to manage and balance various processes in each network element. In one embodiment, a plurality of same/similar NEs may be integrated into the media processing platform 103 as a cluster where these NEs may communicate and interface with a single point of contact, e.g., a load balancer, wherein the load balancer would then communicate and interface with the one or more components of the media processing platform 103.

In step 505, the media processing platform 103 may generate a master parameters list for the at least one NE for use in a processing of a media content item. In one embodiment, the master parameters list may include various functions and operations that may be supported by a NE and various parameters associated with the functions and operations. For example, the master parameters list may include NE identification (e.g., Transcoder-A), operation (e.g., aspect ratio), parameter reference, type, or the like. In one instance, the parameters may be provided by the vendor of a network element, which may be specific to the NE provided by that vendor. For example, a specific master parameters list may directly provide the information and parameters to a given NE, where the NE may properly decode and decipher the information and parameters (e.g., native to the given network element) without a need for abstraction or translation of the information and parameters by any components of the media processing platform 103. In one example, a same parameter may be referred to differently by different types of network elements. In one scenario, after generating the interface between the NE and other components of the media processing platform 103, determining access information associated with the network element, and generating a master parameters list for the network element, the NE may be considered integrated into the media processing platform 103, which may be able to communicate with and utilize the integrated network element. In one embodiment, the master parameters list includes one or more operations that are available at the at least one network element, a parameterization of the one or more operations, or a combination thereof. In one embodiment, the adapter 203b of the core platform 203 may determine to as to which NE is it that a particular processing request (e.g., job order, workflow, parameter lists, etc.) is to be transmitted to and thereby determine an appropriate protocol for establishing a communication with that particular NE and transmitting information associated with the processing request. For example, an adapter 203b may communicate with a plurality of network elements, wherein one or more of the NEs may utilize different communication protocols. In one scenario, the protocol may be determined from the parameter list that would need to be transmitted to a particular network element.

Figure 6:
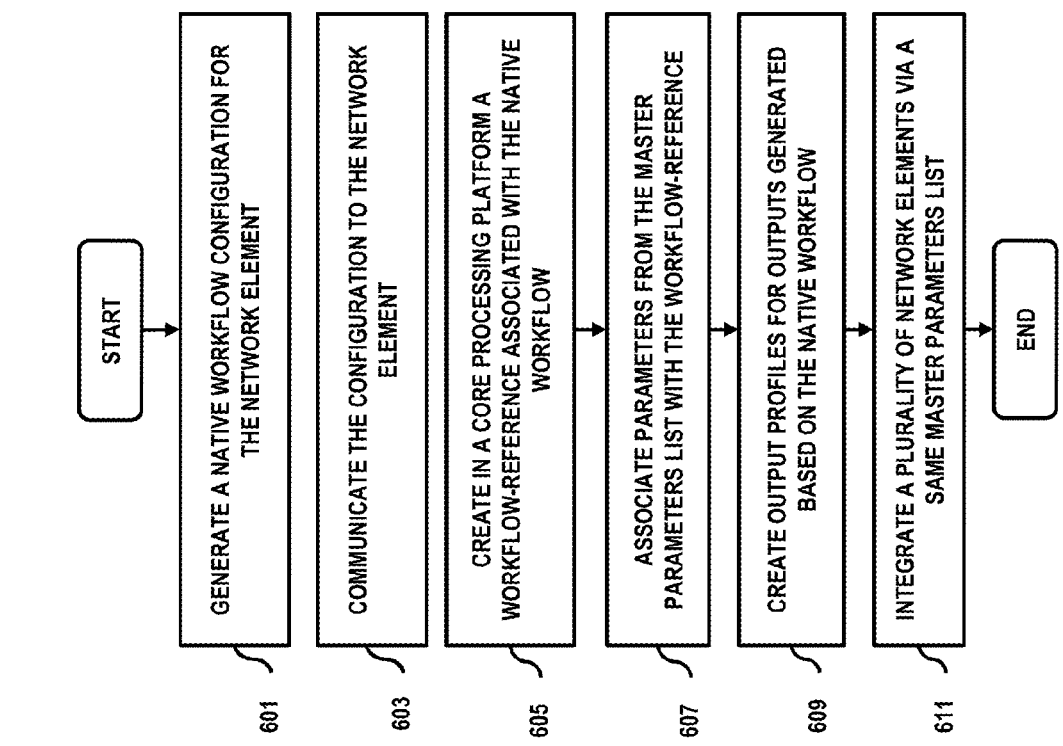
FIG. 6 is a flowchart of a process for configuring network elements, according to one embodiment.

FIG. 6 is a flowchart of a process for configuring network elements, according to one embodiment. For the purpose of illustration, process 600 is described with respect to FIG. 1. It is noted that the steps of the process 600 may be performed in any suitable order, as well as combined or separated in any suitable manner.

In step 601, the media processing platform 103 may generate at least one native workflow for the at least one network element based, at least in part, on requirements of at least one client. In one embodiment, a native workflow may be generated within a NE itself using its native capabilities. In certain scenarios a workflow may reside in one or more elements of the platform where the workflow may be loaded into the NE at execution time, which may include various associated parameters. In one embodiment, the media processing platform 103 may determine information associated with various clients and then generate various native workflows in one or more NEs associated with one or more clients. For example, a native workflow would indicate to a NE as how a media content processing request should be processed, e.g., based on various parameters provided by the clients, the core processing platform, operations and functions available in the network element.

In step 603, the media processing platform 103 may communicate the at least one native workflow configuration to the at least one NE via the at least one interface. In one embodiment, the core processing platform may utilize an interface specific to a NE and transmit to it the native workflow configuration and parameters associated with that particular network element. In one embodiment, a native workflow configuration may be communicated to a plurality of similar/same type of network elements.

In step 605, the media processing platform 103 may create in a core processing platform a workflow-reference associated with the at least one native workflow. In one embodiment, for a native workflow created in a network element, a workflow-reference may be created in a core processing platform so that the core processing platform and/or one or more other components of the media processing platform 103 may be aware of and are able to track and manage the native workflow in the network element. For example, a native workflow "1" may be created in a NE "A" for a client "B" and the workflow-reference in the core processing platform will be associated with that native workflow "1".

In step 607, the media processing platform 103 may associate one or more parameters from the master parameters list with the workflow-reference. In one embodiment, one or more components of the media processing platform 103, e.g., the core processing platform, may select one or more parameters from the master parameters list for associating with a certain workflow at a certain network element. For example, the one or more parameters may include various parameters which may be mandatory, optional, defined, or the like.

In step 609, the media processing platform 103 may create one or more output profiles for one or more outputs generated based, at least in part, on the at least one native workflow in the at least one network element. In one embodiment, an output profile may be utilized to further vary one or more parameters associated with a workflow (e.g., client would like to narrow options, fine tune), which may cause a same workflow to produce various outputs. For example, a client would like to have a video media content item processed to result only a high-definition output (e.g., without a standard-definition version). In one embodiment, a client may utilize the same workflow to process different media content items. For example, run the same job every day to process different video files. In one instance, a user profile may be created at a time when the user creates a user account with the service provider so that various options, features, services, and functionalities may be associated with the user and referenced when the user submits a processing request.

In step 611, the media processing platform 103 may integrate a plurality of network elements based, at least in part, on a same master parameters list. In one embodiment, a service provider may utilize a same master parameters list to integrate a plurality of network elements. For example, the same master parameters list may be utilized to integrate a plurality of similar/same network elements, which may be of the same type and share similar features and functionalities, or may be from a same vendor.

Figure 7:
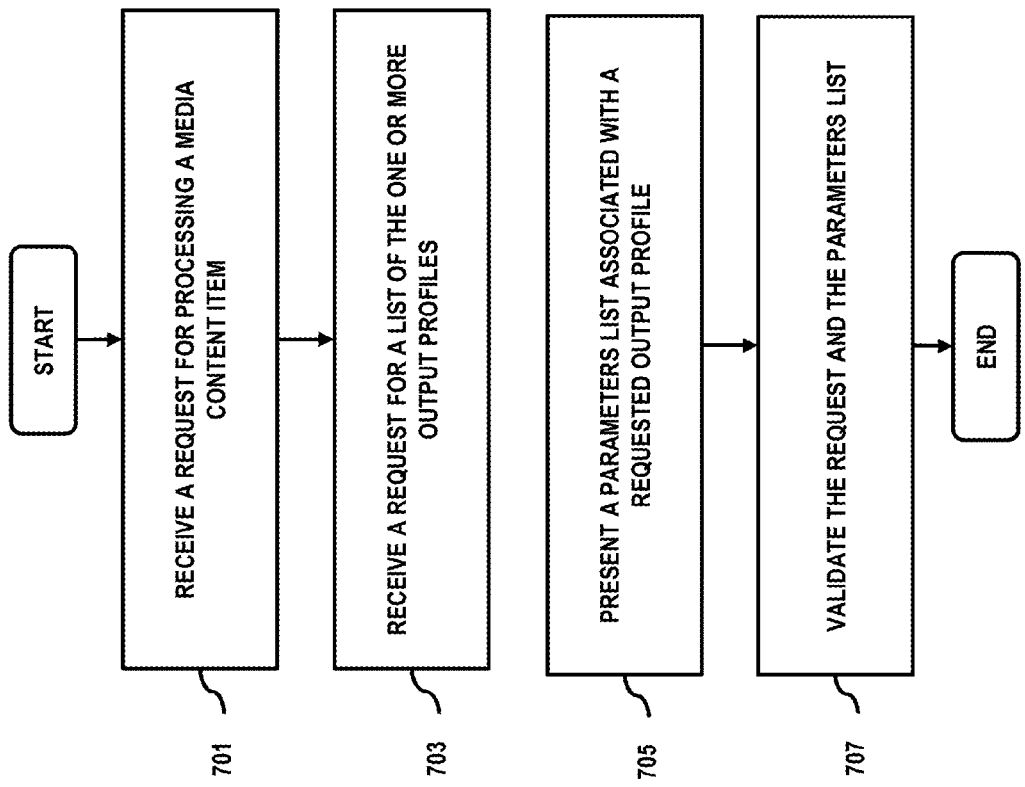
FIGS. 7 and 8 are flowcharts of processes for receiving and executing processing requests, according to one embodiment.
Figure 8:
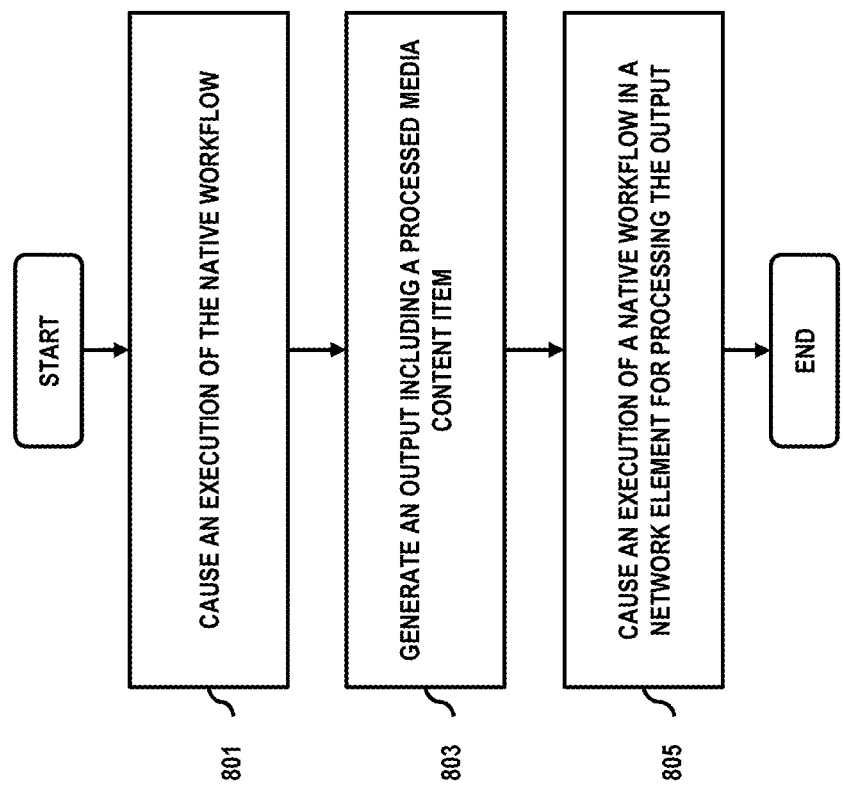

FIGS. 7 and 8 are flowcharts of processes for receiving and executing processing requests, according to various embodiments. For the purpose of illustration, processes 700 and 800 are described with respect to FIG. 1. It is noted that the steps of the processes 700 and 800 may be performed in any suitable order, as well as combined or separated in any suitable manner.

Referring to FIG. 7, the process 700 may begin at step 701, where the media processing platform 103 may receive a request for processing a media content item. In one embodiment, one or more components of the media processing platform 103 may receive a request from a client for performing one or more operations on a media content item (e.g., video, audio, etc.) For example, the ordering platform 201 may receive an input from a user/device (e.g., an enterprise client, a private user, a content producer, an agent, etc.) where the request may include one or more media content items for processing via the media processing platform 103. In one embodiment, the input may include various processing parameters (e.g., Edit Decision List (EDL) files) for creating a parameters list and/or for augmenting one or more existing parameters list, where a parameters list may be associated with one or more NEs for processing the media content item. In one embodiment, the request may be determined via a user interface (UI), an application programming interface (API), a watch folder, or a combination thereof. For example, the UI may present a template, a form, a list, or the like where a user may input the request into the media processing platform 103. In one example, a user device may communicate with the ordering platform 201 via an API for inputting the various processing parameters, the one or more media content items, or the like. In one embodiment, a user and/or a user device may input the request including the processing parameters and the media content item via a storage device associated with the ordering platform 201, wherein one or more folders (watch folders) may be available to receive the parameters and the media content items. In one embodiment, the ordering platform 201 may retrieve the processing parameters or the media content items from the watch folder, for example, upon receiving a periodical or a scheduled indication from the watch folder.

In step 703, the media processing platform 103 may receive a request for a list of the one or more output profiles where a user/client may select an output profile.

In step 705, the media processing platform 103 may present a parameters list associated with a requested output profile. In one embodiment, upon the selection of an output profile, the platform may return a parameters list for the selected profile. In one embodiment, the client may specify and/or override requested values before submitting the completed request. In one embodiment, the media processing platform 103 may retrieve the parameters list associated with the request for processing a media content item. For example, the parameters list may include various elements associated with the client profile, client media content type, parameters associated with a NE that will process the media content item, and the like. In one embodiment, the ordering platform 201 may present a UI with one or more parameter templates, lists, forms, or the like, which may include one or more default parameters. For example, a parameter list associated with a certain media content item type (e.g., video, audio, still images, etc.), a certain user, a certain NE, a certain workflow, etc. may include one or more default parameters, which may or may not be changed. For instance, a particular NE may only operate using a certain default frame rate, height, or width parameters when processing a certain media content item type. In one example, the ordering platform 201 may receive an input from a user for changing and/or updating one or more default parameter values in a parameter list, for instance, override a default value for height/width of 320×240 with 640×480. In one example, an input from the user may cause an update to several default parameters, where the user may not be aware of, for instance, that a change to a parameter "A" would necessarily require a change to a parameter "D."

In one embodiment, the media processing platform 103 may receive an input for specifying one or more input values in the parameters list. In one embodiment, the media processing platform 103 may receive an input from the client for specifying one or more values in the parameters list, wherein the values may be associated with mandatory or optional features. In one embodiment, the user may indicate, select, and/or request for a certain NE to be used in processing the content media item, for example, via the parameter list. For example, the user may wish to select the certain NE because the NE provides a certain functionality or operation that the user would like to use in processing a media content item, or because the user may have previously used that certain NE and would like to achieve similar results in processing of a current media content item. In one embodiment, a certain NE of a type of a NE may be associated with a certain user and/or a certain media content item type. For example, a particular NE may be able to perform a certain process/operation on a certain type of media content item, for instance, a NE may process a video content item for converting the video content item to a vintage black and white version. In one embodiment, the ordering platform may determine and identify the NE for use in processing a given media content item of a job order received from a user. For example, a NE may be identified and selected to perform a time compression operation on an audio content item. In one embodiment, a client may create an account with the service provider where the client may select from a variety of options, parameter lists, services, functionalities, media content item types usually associated with the client, or the like, wherein the media processing platform 103 may identify and provide a list of NEs that may be best suited for providing the services and functionalities selected by the client.

In step 707, the media processing platform 103 may validate the request and the parameters list. In one embodiment, one or more components of the media processing platform 103 may analyze a request and a parameters list for processing one or more media content items so to determine if the requested actions/processes and the parameters list would be valid for processing the one or more media content items. For example, a request to process a video content item and the parameters list would have to concur with the functionalities of a NE that is to perform the processing. In one embodiment, a core engine/processor and/or an adapter 203b of the media processing platform 103 may transmit and/or cause a transmission of a parameter list to one or more identified network elements. In one embodiment, the parameter list may be transmitted, without further processing, to a network element, wherein the parameter list may be substantially native to a given network element. For example, a parameter list and its elements may be transmitted in an "as is" format to the NE so that the NE may process and utilize the parameter list in processing one or more media content items. In one embodiment, the one or more parameter lists may include the one or more operations that are available at the at least one network element, a parameterization of the one or more operations, or a combination thereof.

Referring to FIG. 8, the process 800 may begin at step 801, where the media processing platform 103 may cause an execution of the at least one native workflow at the at least one network element for processing the media content item based, at least in part, on the validated request and the validated parameters list. In one embodiment, the core processing platform may communicate with a NE via the at least one interface and initiate an execution of a native workflow at that NE for processing one or more content items based on parameters associated with an output profile of a client.

In step 803, the media processing platform 103 may generate at least one output including at least one processed media content item. In one embodiment, one or more native workflows at a NE may process the one or more media content items and produce one or more outputs. For example, an output may include a video content item that has been converted from one format to one or more other formats.

In step 805, the media processing platform 103 may cause an execution of at least one native workflow in at least one network elements for processing the at least one output based, at least in part, on one or more validated requests and one or more validated parameters lists. In one embodiment, the core processing platform may initiate a processing of an output from one NE by one or more network elements. For example, a media content item may be processed by a NE according to certain parameters, which may result in one or more original outputs (e.g., various formats of a video content item). Further, at least one of the one or more original outputs may be utilized as an input into one or more workflows at one or more NEs where that original output may be processed again based on one or more parameters (e.g., different than the parameters in the first processing) and workflows.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The systems and processes of FIGS. 1-8, in certain embodiments, advantageously provide for integrating one or more network elements into a media processing platform. Thus, the a media processing platform utilizing the described architecture may provide for a more efficient and flexible architecture wherein various network elements, components, and resources may be quickly integrated and presented to various users in processing various media content items.

The processes described herein for integrating one or more network elements into a media processing platform can be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
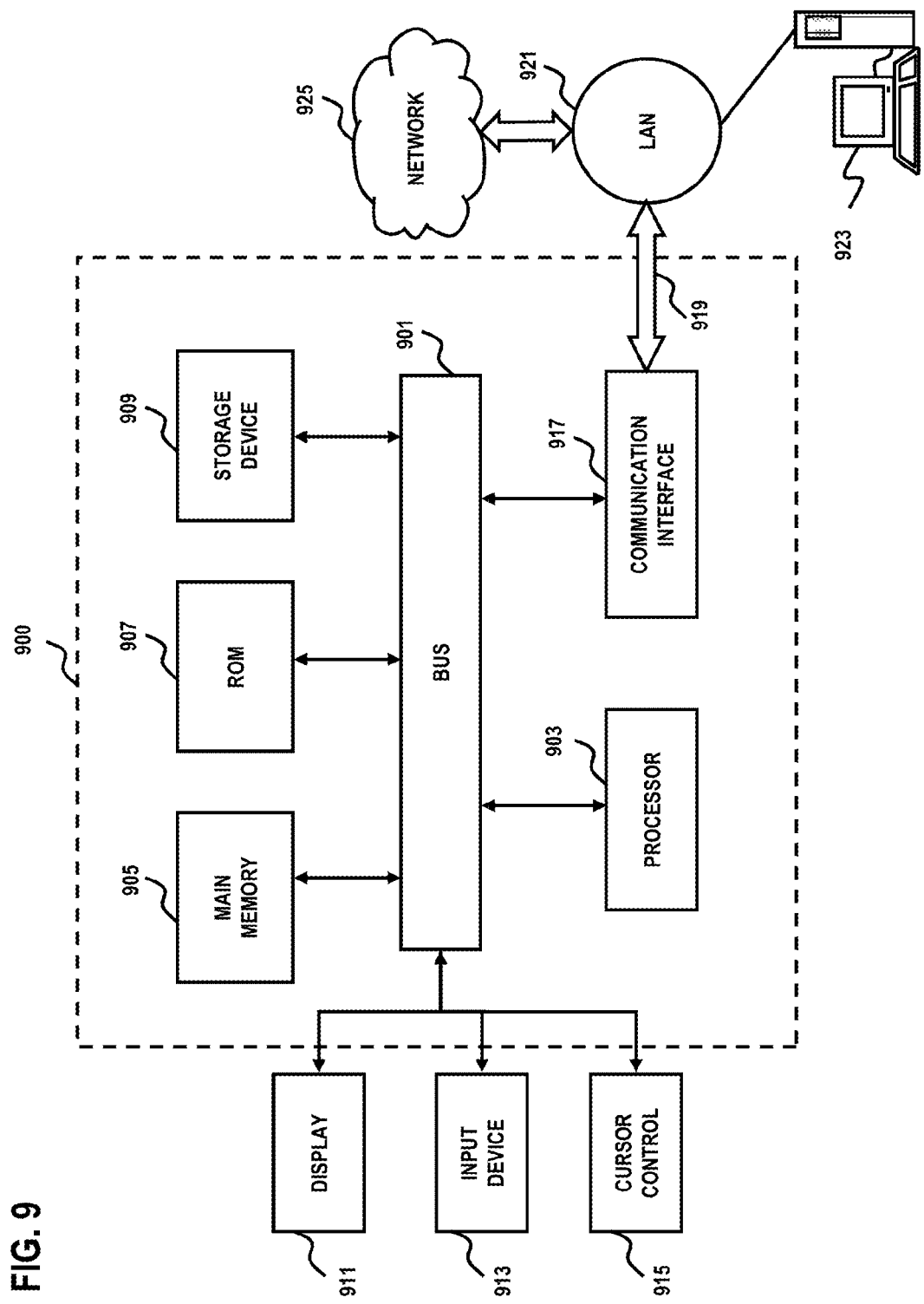
FIG. 9 is a diagram of a computer system that can be used to implement various exemplary embodiments.

FIG. 9 illustrates computing hardware (e.g., computer system) upon which an embodiment according to the invention can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multiprocessing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
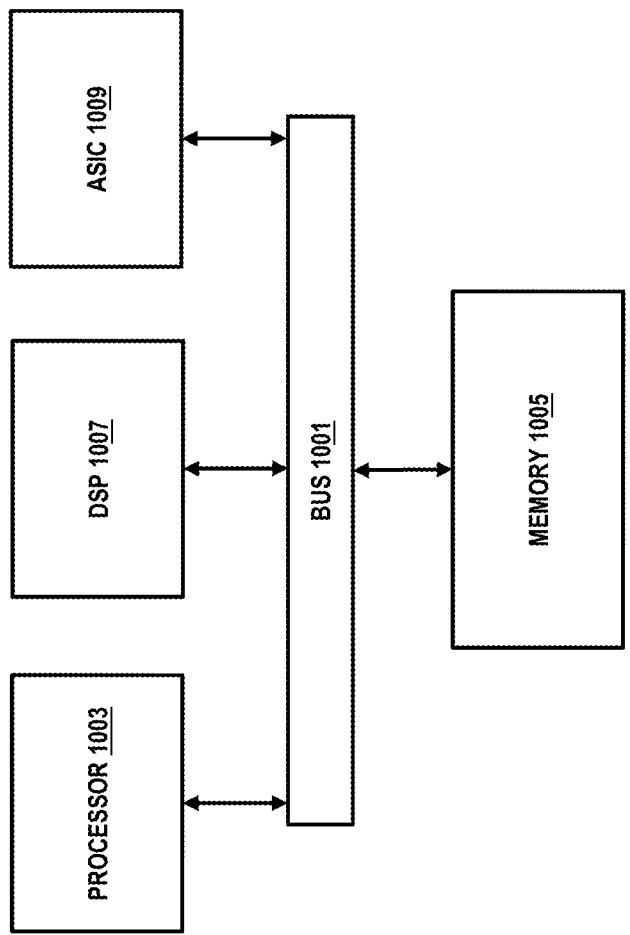
FIG. 10 is a diagram of a chip set that can be used to implement various exemplary embodiments.

FIG. 10 illustrates a chip set 1000 upon which an embodiment of the invention may be implemented. Chip set 1000 is programmed to provide for integrating one or more network elements into a media processing platform and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 5-7.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining, by a media processing device, a network element to be added to a device,
      the added network element including one or more first components for processing media content, and
      the added network element providing at least one of:
         an updated capability,
         an enhanced capability, or
         an additional capability;
   generating, by the media processing device, an interface for interfacing one or more second components of the device with the added network element;
   determining, by the media processing device, access information associated with the added network element,
      the access information including:
         identification information,
         version information,
         communication protocol information, and
         topology information associated with the added network element;
   generating, by the media processing device, a master parameters list for the added network element for use in a processing of a media content item,
      the master parameters list including:
         an indication of a function or operation supported by the added network element, and
         a parameter associated with the function or operation,
            the parameter being specific to a particular vendor of the added network element;
   generating, by the media processing device, a native workflow for the added network element based on requirements of a client device,
      the native workflow comprising a plurality of ordered functionality tasks to be performed by the added network element in processing the media content item, and
      the media processing device being different than the client device;
   communicating, by the media processing device, the native workflow to the added network element via the interface;
   creating, by the media processing device, a workflow-reference corresponding to the native workflow;
   associating, by the media processing device, the parameter with the workflow-reference;
   creating, by the media processing device, one or more output profiles for one or more outputs generated based on the native workflow in the added network element,
      the one or more output profiles being used to vary the parameter associated with the native workflow;
   integrating, by the media processing device, a plurality of network elements using the master parameters list,
      the plurality of network elements comprising the added network element;
   receiving, by the media processing device, a first request for processing the media content item via a user interface,
      the user interface comprising a template including default and selectable processing parameters for use in processing the media content item;
   receiving, by the media processing device, a second request for a list of the one or more output profiles;
   providing, by the media processing device and for presentation at the user interface, a parameters list associated with a requested output profile;
   validating, by the media processing device, the first request and the parameters list by determining whether the first request and the parameters list concur with functionalities, of the plurality of ordered functionality tasks, that the added network element is to perform when processing the media content item;
   executing, by the media processing device, the native workflow at the added network element to process the media content item based on a plurality of validated requests and a plurality of validated parameters lists; and
   generating, by the media processing device, a processed media content item based on executing the native workflow at the added network element.

2. The method of claim 1, wherein the master parameters list includes at least one of:
   one or more operations that are available at a plurality of network elements, or
   a parameterization of the one or more operations.

3. The method of claim 1, further comprising:
   integrating a plurality of network elements based on a same master parameters list.

4. A non-transitory computer-readable medium storing instructions, the instructions comprising:
   one or more instructions that, when executed by a processor cause the processor to:
      determine a network element to be added to a device,
         the added network element including one or more first components for processing media content, and
         the added network element providing at least one of:
            an updated capability,
            an enhanced capability, or
            an additional capability,
      generate an interface for interfacing one or more second components of the device with the added network element;

determine access information associated with the added
   network element,
   the access information including:
      identification information,
      version information,
      communication protocol information, and
      topology information associated with the added
         network element;
generate a master parameters list for the added network
   element for use in a processing of a media content
   item,
   the master parameters list including:
      an indication of a function or operation supported
         by the added network element, and
      a parameter associated with the function or operation,
         the parameter being specific to a particular
            vendor of the added network element;
generate a native workflow for the added network
   element based on requirements of a client device,
   the native workflow comprising a plurality of
      ordered functionality tasks to be performed by the
      added network element in processing the media
      content item;
communicate the native workflow to the added network
   element via the interface;
create a workflow-reference corresponding to the
   native workflow;
associate the parameter with the workflow-reference;
create one or more output profiles for one or more
   outputs generated based on the native workflow in
   the added network element,
   the one or more output profiles being used to vary the
      parameter associated with the native workflow;
integrate a plurality of network elements using the
   master parameters list,
   the plurality of network elements comprising the
      added network element;
receive a first request for processing the media content
   item via a user interface,
   the user interface comprising a template including
      default and selectable processing parameters for
      use in processing the media content item;
receive a second request for a list of the one or more
   output profiles;
provide, for presentation at the user interface, a parameters list associated with a requested output profile;
validate the first request and the parameters list by
   determining whether the first request and the parameters list concur with functionalities, of the plurality
   of ordered functionality tasks, that the added network element is to perform when processing the
   media content item;
execute the native workflow at the added network
   element to process the media content item based on
   a plurality of validated requests and a plurality of
   validated parameters lists; and
generate a processed media content item based on
   executing the native workflow at the added network
   element.

5. The non-transitory computer-readable medium of claim 4, wherein the master parameters list includes at least one of:
one or more operations that are available at a plurality of network elements, or
a parameterization of the one or more operations.

6. The non-transitory computer-readable medium of claim 4, where the one or more instructions, when executed by the processor, further cause the processor to:
integrate a plurality of network elements based on a same master parameters list.

7. A device comprising:
a memory storing instructions, and
one or more processors to execute the instructions to:
   determine a network element to be added to the device,
      the added network element including one or more
         first components for processing media content,
         and
      the added network element providing at least one of:
         an updated capability,
         an enhanced capability, or
         an additional capability;
   generate an interface for interfacing one or more second components of the device with the added network element;
   determine access information associated with the added
      network element,
      the access information including:
         identification information,
         version information,
         communication protocol information, and
         topology information associated with the added
            network element;
   generate a master parameters list for the added network
      element for use in a processing of a media content
      item,
      the master parameters list including:
         a function or operation supported by the added
            network element, and
         a parameter associated with the function or operation,
            the parameter being specific to a particular
               vendor of the added network element;
   generate a native workflow for the added network
      element based on requirements of a client device,
      the native workflow comprising a plurality of
         ordered functionality tasks to be performed by the
         added network element in processing the media
         content item;
   communicate the native workflow to the added network
      element via the interface;
   create a workflow-reference corresponding to the
      native workflow;
   create one or more output profiles for one or more
      outputs generated based on the native workflow in
      the network element,
      the one or more output profiles being used to vary a
         parameter associated with the native workflow;
   integrate a plurality of network elements using the
      master parameters list,
      the plurality of network elements comprising the
         added network element;
   receive a first request for processing the media content
      item via a user interface,
      the user interface comprising a template including
         default and selectable processing parameters for
         use in processing the media content item;
   receive a second request for a list of the one or more
      output profiles;
   provide, for presentation at the user interface, a parameters list associated with a requested output profile;
   validate the first request and the parameters list by
      determining whether the first request and the parameters list concur with functionalities, of the plurality of ordered functionality tasks, that the added network element is to perform when processing the media content item;
execute the native workflow at the added network element to process the media content item based on a plurality of validated requests and a plurality of validated parameters lists; and
generate a processed media content item based on executing the native workflow at the added network element.

8. The device of claim 7, where the one or more processors are further to:
associate one or more parameters from the master parameters list with the workflow-reference.

9. The device of claim 7, wherein the master parameters list includes at least one of:
one or more operations that are available at a plurality of network elements, or
a parameterization of the one or more operations.

10. The device of claim 7, where the one or more processors are further to:
integrate a plurality of network elements based on a same master parameters list.

11. The method of claim 1, wherein the master parameters list includes:
an aspect ratio for a display,
an aspect height,
an aspect width,
a frame rate for a video presentation, or
a starting timecode.

12. The non-transitory computer-readable medium of claim 4, wherein the master parameters list includes:
an aspect ratio for a display,
an aspect height,
an aspect width,
a frame rate for a video presentation, or
a starting timecode.

13. The method of claim 1, further comprising:
transmitting the parameters list to the added network element for utilization in processing the media content item.

14. The non-transitory computer-readable medium of claim 4, where the one or more instructions, when executed by the processor, further cause the processor to:
generate one or more outputs based on the processed media content item,
the one or more outputs including a video content item that has been converted to another format.

15. The method of claim 1, where the added network element includes at least one of:
a server,
an executable program,
an application, or
an algorithm.

16. The method of claim 1, where the media content item includes at least one of:
information associated with an author of the media content,
information associated with a copyright of the media content,
information associated with a rating of the media content, or
information associated with a title of the media content.

17. The non-transitory computer-readable medium of claim 4, where the one or more instructions, when executed by the processor, are further to:
integrate the added network element into a platform by loading topology details of the added network element into one or more components of the platform.

18. The non-transitory computer-readable medium of claim 4, where the one or more instructions, when executed by the processor, are further to:
receive a user selection, via the user interface, of the added network element; and
where the one or more instructions, that cause the processor to execute the native workflow, cause the processor to:
execute the native workflow based on the user selection.

19. The device of claim 7, where the one or more outputs are utilized for one or more other workflows.

20. The device of claim 7, where the one or more outputs include a video content item that has been converted from a first format to a second format.

* * * * *